US012695339B2

(12) United States Patent
Fantuz et al.

(10) Patent No.: US 12,695,339 B2
(45) Date of Patent: Jul. 28, 2026

(54) ROTOR FOR A ROTARY ELECTRIC MACHINE

(71) Applicant: NIDEC PSA EMOTORS, Carrieres sous Poissy (FR)

(72) Inventors: Diana Fantuz, Plaisir (FR); Guillaume Tardy, La Celle St Cloud (FR); Olivier Gas, Gond Pontouvre (FR)

(73) Assignee: NIDEC PSA EMOTORS, Carrieres souis Poissy (FR)

( * ) Notice: Subject to any disclaimer, the term of this patent is extended or adjusted under 35 U.S.C. 154(b) by 280 days.

(21) Appl. No.: 18/248,620

(22) PCT Filed: Sep. 13, 2021

(86) PCT No.: PCT/FR2021/051557
§ 371 (c)(1),
(2) Date: Apr. 11, 2023

(87) PCT Pub. No.: WO2022/079364
PCT Pub. Date: Apr. 21, 2022

(65) Prior Publication Data
US 2023/0378830 A1 Nov. 23, 2023

(30) Foreign Application Priority Data
Oct. 14, 2020 (FR) ...................................... 2010506

(51) Int. Cl.
*H02K 1/27* (2022.01)
*H02K 1/276* (2022.01)
(52) U.S. Cl.
CPC .................................... *H02K 1/276* (2013.01)
(58) Field of Classification Search
CPC ....... H02K 1/276; H02K 1/2766; Y02E 10/72
See application file for complete search history.

(56) References Cited

U.S. PATENT DOCUMENTS 5,581,140 A 12/1996 Futami et al.
2014/0000096 A1 1/2014 Takemoto
(Continued)

FOREIGN PATENT DOCUMENTS

CN 108667175 A * 10/2018
DE 10 2007 036315 A1 2/2009
(Continued)

OTHER PUBLICATIONS

International Search Report for PCT/FR2021/051557 mailed Nov. 15, 2021.
Written Opinion for PCT/FR2021/051557 mailed Nov. 15, 2021.

*Primary Examiner* — Thomas Truong
(74) *Attorney, Agent, or Firm* — Sandberg Phoenix & von Gontard, PC

(57) ABSTRACT

Rotor (30) for a rotary electric machine, including:
at least one permanent magnet (1) having, in cross section, at least one large side (2a) and at least one small side (3a),
a rotor body (33) including stacked sheets, the rotor body (33) including at least one recess (4) receiving the permanent magnet (1), the recess (4) being delimited by at least one face (5a) opposite the large side (2a) of the permanent magnet (1),
at least one sheet (6) including at least one deformable tongue (7) connecting to the face (5a) of the recess (4) and extending into the recess (4), the deformable tongue (7) being angled and including a foldable portion (8) configured to be pressed against the small side (3a) of the permanent magnet (1).

16 Claims, 4 Drawing Sheets

(56)                 References Cited

U.S. PATENT DOCUMENTS

| | | | |
|---|---|---|---|
| 2014/0077650 A1 | 3/2014 | Takahashi | |
| 2015/0137650 A1* | 5/2015 | Takahashi | H02K 1/32 |
| | | | 310/156.56 |
| 2019/0214864 A1* | 7/2019 | Günther | H02K 1/2773 |
| 2020/0014260 A1* | 1/2020 | Arai | H02K 1/28 |

FOREIGN PATENT DOCUMENTS

| | | | |
|---|---|---|---|
| DE | 10 2011 078054 A1 | | 12/2012 |
| DE | 10 2016 204972 A1 | | 9/2017 |
| EP | 1009085 B1 | | 12/2005 |
| EP | 2115855 A1 | | 11/2009 |
| EP | 3598610 A1 | | 1/2020 |
| FR | 3069115 B1 | | 1/2020 |
| JP | 2001-258187 A | | 9/2001 |
| JP | 2012170190 A | * | 9/2012 |

* cited by examiner

ROTOR FOR A ROTARY ELECTRIC MACHINE

CROSS-REFERENCE TO RELATED APPLICATIONS

This application is the US National Stage under 35 USC § 371 of International Application No. PCT/FR2021/051557, filed Sep. 13, 2021, which claims the priority of French application 2010506 filed on Oct. 14, 2020, the content (text, drawings and claims) of both said applications being incorporated by reference herein.

TECHNICAL FIELD

The methods and devices disclosed herein relate to rotary electric machines and, more particularly, to the rotors of such machines. The present disclosure relates to permanent-magnet rotors.

More particularly, the present disclosure relates to synchronous or asynchronous AC machines. It especially relates to traction or drive machines for electric motor vehicles (Battery Electric Vehicle) and/or hybrid motor vehicles (Hybrid Electric Vehicle—Plug-in Hybrid Electric Vehicle), such as private cars, vans, trucks or buses. The present disclosure also applies to rotary electric machines for industrial and/or power generation applications, especially naval, aerospace or wind turbine applications.

Permanent-magnet rotors are generally composed of a rotor body and of permanent magnets of various geometric shapes.

The rotor body may include a stack of cut, thin magnetic sheets. It may include one or more stacks of sheets stacked one on top of the other.

The permanent magnets may be arranged on the surface, directly facing the air gap or, alternatively, be arranged inside the rotor body, in recesses thereof, then being said to be "buried" or "embedded".

In this case, it is necessary to radially and/or axially lock the magnets in their recesses, and this locking has to be sufficient to avoid damaging the magnets and allow the rotary electric machine to operate correctly. Indeed, in the event of insufficient wedging in place, the magnets may be subject to micromovements, which may lead to the magnets being damaged, the electrical and magnetic performance of the machine being negatively affected, and balancing faults.

To secure the magnet in its recess, multiple techniques are currently applied, such as the use of adhesive, a matching specific magnet shape and recess shape, for example the use of magnets having a trapezoidal cross section, or impregnating the magnet in its recess after it has been put in place.

However, these techniques have certain drawbacks. They can be difficult and expensive to implement.

The adhesive bonding of the magnets into their recesses is a lengthy process which generally requires a heating operation followed by a cooling operation. The bonding of the magnets may also entail leakages, which affects the cleanliness of the parts and makes the production of the machine more complex. In addition, the bonding of the magnets involves a risk of variation in positioning between the different magnets for one and the same stack of sheets as well as between stacks if the magnets are not preset in place before the bonding step. Lastly, the bonding may present a problem in terms of the assembly's service life for certain applications, and makes it practically impossible to recover the magnets without damage.

Regarding impregnation, this is a lengthy, very expensive and space-demanding process in terms of implementation, given the need to use impregnation tanks and ovens. Furthermore, this involves thermal stress which may risk demagnetization of the magnets and likewise makes it impossible to recover the magnets without damage.

Finally, the use of magnets that have a specific shape significantly increases the total production cost of the machine because of the high cost of these magnets. Furthermore, the specific shapes of these magnets may complicate the production of the magnetic sheet and the cutting out thereof.

Additionally, in order to improve the cost and performance of electric machines, it may be necessary to increase the quantity of magnets, especially when it is not possible to improve their quality, or to retain the same level of performance with less expensive magnets of lesser quality.

Optimal electromagnetic performance is obtained when a buried magnet—which has, in cross section, two small opposing sides and two large opposing sides—is in perfect contact on each of its two large opposing sides with the stack of sheets in which it is buried, with the flow of the magnetic flux from the magnets to the stack of sheets being maximized.

However, there is generally a clearance between the magnets and their recesses in the stack of sheets into which they are inserted, thus forming an air gap from a magnetic point of view which inevitably causes losses in the electromagnetic performance of the machine. Such a clearance is related to production constraints which do not make it possible, at reasonable cost, to observe very precise dimensions in the cutting out of the sheets or in the design of the magnets. A clearance may also be due to the fact that since the magnets are susceptible to corrosion, it may be necessary to cover them with a protective coating which also leads to uncertainty in their dimensions.

Furthermore, mounting constraints require a certain degree of clearance to be maintained between the magnets and the recesses in the stack of sheets so as to facilitate the insertion of the magnets thereinto, especially when the stack of sheets is formed of a stack of thin magnetic sheets. Indeed, in this case, the walls of the stack of sheets may not be perfectly straight given the fact that they are made up of a stack of thin sheets, which may require an even greater clearance for mounting.

In the case where the machine includes multiple magnets arranged in several rows per pole in the stack of sheets, the sets of magnets of the different rows add up and accordingly weaken the magnetic performance of the machine.

The subject matter of application FR 3-069-115 is a rotor including a stack of sheets formed by a stack of identical sheets, each sheet including a deformable tongue for keeping a permanent magnet in its recess. The deformable tongue is connected to the recess face located facing the small side of the magnet.

Applications DE 10 2007 036315 and EP 2 115 855 describe tongues that deform in the plane of the sheet.

Applications DE 10 2011 078054 and DE 10 2016 204972 describe tongues that are connected to the recess face located facing the small side of the magnet.

Applications US 2014/0077650 and US 2014/0000096 disclose holding magnets in place with wedges.

There is a need to improve magnetic performance and to decrease the manufacturing and assembling costs of rotary electric machines.

SUMMARY

Rotor

The present disclosure aims to address this need and one object thereof, according to one of its aspects, is therefore a rotor for a rotary electric machine, including:

at least one permanent magnet that has, in cross section, especially perpendicular to an axis of rotation of the rotor, at least one large side and at least one small side, a rotor body including stacked sheets, the rotor body including at least one recess accommodating the permanent magnet, the recess being delimited by at least one face facing the large side of the permanent magnet, at least one sheet including at least one deformable tongue connecting to the face of the recess and extending into the recess, the deformable tongue being angled and including a bendable portion that is configured to press against the small side of the permanent magnet.

The cross section of a permanent magnet is perpendicular to an axis of rotation of the rotor.

The rotor body may include one or more stacks of sheets stacked one on top of the other. Each stack of sheets may include at least one recess accommodating the permanent magnet. In the case where the rotor body includes multiple stacks of sheets, the rotor body may include, for one and the same recess, one or more permanent magnets, for example one permanent magnet per stack of sheets.

The deformable tongue may be formed in a sheet of the rotor body. It may be integral with the rest of the sheet.

The deformable tongue can include a bendable portion that is configured to be bent out of the plane of the sheet so as to press against the small side of the permanent magnet.

The surface state of the deformable tongue may be the same as that of the rest of the sheet.

The deformable tongue may include a face that has burrs as a result of cutting the deformable tongue into the sheet and a face without burrs.

Preferably, the bendable portion of the deformable tongue is configured to press, via its face without burrs, against the small side of the permanent magnet. This allows the face without burrs to be on the side of the magnet, and thereby avoid damaging the permanent magnet when it is inserted into the recess.

The deformable tongue may be configured to deform out of the plane of the sheet.

The bendable portion of the deformable tongue may be bent out of the plane of the sheet so as to press against the small side of the permanent magnet when the permanent magnet is in place in the recess. Once bent, the bendable portion preferably forms an angle of substantially 90° relative to the rest of the deformable tongue.

The bendable portion of the deformable tongue may be configured to bend so as to press against the small side of the permanent magnet following the deformation of the deformable tongue by the permanent magnet, especially when the permanent magnet is inserted longitudinally into the recess, along the axis of rotation of the rotor.

The permanent magnet may be introduced into the recess, along the axis of rotation of the rotor, while magnetized or unmagnetized.

The deformable tongue may exert, after deformation, a pushing force on the permanent magnet so as to hold it in the recess.

The deformable tongue may allow the permanent magnet to be mechanically locked in the recess when it is inserted into the recess and/or during the operation of the machine when the permanent magnet is in place in the recess. The deformable tongue may thus allow the permanent magnet to be prepositioned and/or held in the recess, especially during the operation of the machine. The presence of the deformable tongue allows the use of adhesive to be avoided. It can make it possible to minimize both micromovements of the permanent magnet in the recess and therefore the risk of the permanent magnet cracking, and vibrations of the permanent magnet in the recess and therefore noise.

The bendable portion of the deformable tongue may be configured to press substantially against the middle of the small side of the permanent magnet.

The deformable tongue may be connected to the face of the recess which is opposite the air gap, which is on the side of the axis of rotation of the rotor, and which is farthest from the axis of the pole to which the permanent magnet in question belongs.

The permanent magnet may have in cross section a first small side and a second small side, opposite the first side.

The bendable portion may be configured to press against the first small side of the permanent magnet.

For one and the same recess, the rotor may include some deformable tongues whose bendable portions are configured to press against the first small side of the permanent magnet and other deformable tongues whose bendable portions are configured to press against the second small side of the permanent magnet At least one sheet may include at least one stop facing the second small side of the permanent magnet. The face of the recess including the stop may be the face of the recess to which the deformable tongue is connected or, alternatively, the opposite face.

The deformable tongue may be configured to exert a pushing force on the permanent magnet so that the latter bears against the stop. The stop may extend into a lateral portion of the recess, facing the second small side of the permanent magnet. This lateral portion of the recess may thus allow a magnetic void to be provided, which helps to promote the flow of the magnetic flux through the rotor in an optimized manner.

At least one sheet may include at least one wedge facing the first small side of the permanent magnet. The face of the recess including the wedge may be the face of the recess to which the deformable tongue is connected or, alternatively, the opposite face.

The wedge may be located in the vicinity of the deformable tongue, for example being placed between the deformable tongue and the permanent magnet when the latter is in place in the recess. Alternatively, the sheets could be without such a wedge.

The presence of a wedge facing the first small side of the permanent magnet and a stop facing the second small side of the permanent magnet may allow better guidance of the permanent magnet when it is inserted longitudinally into the recess, along the axis of rotation of the rotor.

The deformable tongue may extend between a connecting end for connecting to the face of the recess and a free end.

The width of the deformable tongue may decrease from its connecting end to its free end. This allows the tongue to have high strength at its connecting end. The narrowing of the deformable tongue from its connecting end to its free end allows the deformable tongue to deform on its free end.

The width of the deformable tongue is measured transverse to the axis of elongation of the deformable tongue.

The connecting end may allow the deformable tongue to be connected to the face of the recess facing the large side of the permanent magnet.

The deformable tongue may be angled between its connecting end and its free end. It may include an angled portion.

The axis of elongation of the deformable tongue may be curved, following the angled portion of the deformable tongue.

The deformable tongue may include an axis of elongation including two rectilinear portions, namely a first rectilinear portion at the connecting end of the deformable tongue, and a second rectilinear portion at the bendable portion of the deformable tongue.

An angle between the first and second rectilinear portions may be between 90° and 180°, preferably between 100° and 170°, or even between 110° and 160°, especially between 120° and 150°.

The angled portion may connect the first and second rectilinear portions to one another.

The deformable tongue may include a bending region and be deformable, especially plastically, by bending in the bending region so as to allow the bendable portion to press against the small side of the permanent magnet.

The deformable tongue may have a narrowing in its width. The presence of such a narrowing may allow a region to be obtained in which the width of the deformable tongue is decreased so as to facilitate the deformation of the deformable tongue through the bending of its bendable portion. The narrowing thus allows a region to defined in which the tongue deforms by bending, that is the bending region. The narrowing may be located in the bending region.

The narrowing may be formed by a cutout.

The cutout may take any shape, for example a rounded or non-rounded shape, an angled shape, especially a square, rectangular, triangular shape, or correspond to a longitudinal notch.

The cutout may be made in a just one side of the deformable tongue, either on the side of the inside of the angled portion or on the side of the outside of the angled portion. Alternatively, the cutout may be made on both sides of the deformable tongue.

The deformable tongue may include a bending axis that extends in a plane parallel to the plane of the sheet. The deformable tongue may thus deform, especially plastically, by bending along this bending axis. The bending axis may extend in a direction parallel to the small side of the permanent magnet. The bending axis may be located in the bending region. The narrowing may be located at the bending axis of the deformable tongue.

The first rectilinear portion may extend between the connecting end and the angled portion, especially with a width that decreases toward the angled portion.

The second rectilinear portion may extend between the angled portion and the bending region, especially with a width that decreases toward the bending region.

The bendable portion may extend between the bending region and the free end of the deformable tongue, for example with a constant width.

The bending region may be located midway between the angled portion and the free end of the deformable tongue. Alternatively, the bending region is located closer to the angled portion than to the free end of the deformable tongue.

The thickness of the deformable tongue may be equal to that of the sheet of the rotor body in which the deformable tongue is formed. The thickness of the sheet may be between 0.1 and 0.5 mm, especially between 0.2 and 0.4 mm. For example, the thickness of the sheet is 0.27 mm or 0.35 mm.

The rotor body may include at least two consecutive sheets, for example two or three, each with a deformable tongue, the deformable tongues of two consecutive sheets being superposed. This may be particularly advantageous in the case where the sheets are not thick enough, for example when they are 0.4 mm thick or less, because in this case the deformable tongues of each of the sheets taken individually do not have the required mechanical characteristics to allow them to exert sufficient pushing force on the permanent magnet after deformation.

The length of the bendable portion may be at least 1.5 times the thickness of the sheet, preferably between 2 and 15 times the thickness of the sheet, more preferably between 3 and 10 times the thickness of the sheet.

The length of the second portion may be at least 1.5 times the thickness of the sheet, preferably between 2 and 4 times the thickness of the sheet.

The deformable tongue may have at its free end a width of at least 1 mm, especially between 2.5 and 4.5 mm.

The width of the deformable tongue at its free end may be substantially equal to or slightly less than the width of the permanent magnet, that is, the width of the small side of the permanent magnet. A free end with a width that is slightly less than the width of the permanent magnet may make it possible to avoid, when the permanent magnet is inserted longitudinally into the recess, any friction between the bendable portion of the deformable tongue and a face of the recess located facing a large side of the permanent magnet, which would hinder the insertion of the permanent magnet into the recess.

The deformable tongue may include or consist of a material chosen from M 330-35, NO35-19 and NO27-15 steels, copper and mixtures thereof. Such materials may allow an optimal trade-off to be obtained between, on the one hand, sufficient flexibility and suppleness of the deformable tongue to allow, when the permanent magnet is inserted longitudinally into the recess, the deformation, especially plastic deformation, of the deformable tongue, while avoiding breaking the deformable tongue, deforming the rotor body and/or damaging the permanent magnet, and, on the other hand, an ability to exert a pushing force on the permanent magnet after deformation of the deformable tongue.

The material constituting the deformable tongue may be the same as or different from that of the rest of the sheet.

The recess may include a cutout made in the face of the recess to which the deformable tongue is connected. The cutout may be made in the face of the recess between the deformable tongue and the permanent magnet. In the case where the rotor includes a wedge as described hereinbefore, the cutout may be made in the face of the recess between the deformable tongue and the wedge. The presence of such a cutout makes it possible to increase the connecting radius between the recess and the connecting end of the deformable tongue connecting to the face of the recess, and therefore to minimize the value of the radius or chamfer of the permanent magnet.

At least part of the permanent magnet may extend into the space formed in the recess by the cutout. The permanent magnet may thus at least partially cover the cutout. The flow of the magnetic flux through the rotor may be improved thereby.

In the case where the rotor includes a wedge as described hereinbefore, the rotor body may include at least one sheet including a wedge as described hereinbefore but without a deformable tongue or cutout as described hereinbefore, and at least one sheet including at least one deformable tongue and at least one cutout as described hereinbefore but without a wedge.

The rotor may include at least two deformable tongues distributed along the rotor body for one and the same recess, and preferably at least five, ten or twenty deformable tongues. For example, the rotor includes five or six deformable tongues distributed along the rotor body for one and the same recess.

In the case where the rotor body includes several stacks of sheets stacked one on top of the other, each stack of sheets may include at least two deformable tongues distributed along the stack of sheets for one and the same recess, and preferably at least five, ten or twenty deformable tongues. For example, each stack of sheets includes five or six deformable tongues distributed along the stack of sheets for one and the same recess.

The greater the number of deformable tongues, the greater the pushing force exerted by the deformable tongues after deformation on the permanent magnet. Thus, the greater the number of deformable tongues, the better the permanent magnet is mechanically locked in the recess.

The number of deformable tongues may be chosen so as to ensure sufficient mechanical locking of the permanent magnet in the recess to avoid damage to the permanent magnets and to allow the rotary electric machine to operate correctly.

The deformable tongues may be distributed uniformly or non-uniformly along the rotor body.

The spacing between two consecutive deformable tongues may be greater than or equal to the length of the bendable portion. It may especially be greater than 0.675 mm, or even greater than 0.81 mm. It may also be smaller than 4.32 mm, or even smaller than 2.97 mm. Such a spacing is necessary to allow the bendable portion of the deformable tongue to be able to bend out of the plane of the sheets so as to press against the small side of the permanent magnet.

One and the same sheet of the rotor body may include multiple deformable tongues, each deformable tongue being especially formed in said sheet and being especially integral with the rest of said sheet. Said sheet may include multiple recesses and one deformable tongue per recess. The rotor body may then include both sheets including multiple recesses and one deformable tongue per recess, and sheets without a deformable tongue. For example, the rotor body may include a sheet including multiple recesses and one deformable tongue per recess every N sheets, N being an integer between 2 and 20, preferably between 4 and 15. There is then a sheet including multiple recesses and one deformable tongue per recess and then multiple sheets without a deformable tongue, and so on. Therefore, not all of the sheets of the rotor body have to be identical.

Alternatively, all of the sheets of the rotor body may be identical. For example, each sheet may include multiple recesses and a deformable tongue for one of these recesses. The rotor body then includes a stack of said sheets, each sheet being angularly offset relative to the axis of rotation of the rotor so as to have deformable tongues for each recess.

The rotor body may include, at one of the ends thereof, sheets that are without a deformable tongue.

Likewise, in the case where the rotor body includes multiple stacks of sheets stacked one on top of the other, each stack may include, at one of the ends thereof, sheets that are without a deformable tongue.

This makes it possible to avoid having sheets whose deformable tongues project out of the rotor body or of the stack of sheets after deformation through the permanent magnet being longitudinally inserted into the recess. This may thus allow the stack of sheets to be stacked one on top of the other.

The rotor body or each stack of sheets may include, at one of the ends thereof, multiple sheets provided with deformable tongues that are configured so as not to bend when the permanent magnet is longitudinally inserted into the recess.

These sheets are preferably identical, which allows the deformable tongues to be stiffened and thereby prevent them from being deformed when the permanent magnet is longitudinally inserted into the recess.

Such tongues can then act as a stop and define the bottom of the recess. These tongues thus make it possible to stop the longitudinal movement of the permanent magnet in the recess when it reaches the bottom of the recess, that is when it has been completely inserted into the recess.

The recess may be delimited by at least one face facing a large side of the permanent magnet, said face including at least one deformation that is convex toward the interior of the recess, and preferably at least two deformations that are convex toward the interior of the recess. What is meant by "deformation that is convex toward the interior of the recess" is a local deformation of the sheet oriented into the recess. Mention may also be made of punching.

The one or more deformations may allow the permanent magnet to be held against the opposite face of the recess.

The face of the recess including the one or more deformations may be the face of the recess to which the deformable tongue is connected or, alternatively, the opposite face.

When the face of the recess includes a deformation that is convex toward the interior of the recess, the deformation may be positioned on the face of the recess so as to face the middle of the large side of the magnet.

When the face of the recess includes two deformations that are convex toward the interior of the recess, the deformations divide the large side of the magnet into three sections. The deformations may be positioned on the face of the recess so as to face the first and second sections of the large side of the magnet, respectively.

The recess may be delimited by at least one face facing a large side of the permanent magnet, said face including at least one deformable tab that extends into the recess. The deformable tab may include a free end that is configured to press against the large side of the permanent magnet and hold the permanent magnet against the opposite face of the recess.

The deformable tab may be configured to deform out of the plane of the sheets. The face of the recess including the deformable tab may be the face of the recess to which the deformable tongue is connected or, alternatively, the opposite face.

The recess may have a major axis and a minor axis in cross section.

The presence of the deformable tongue may allow the permanent magnet to be mechanically locked in position in the recess along the major axis of the recess. This may allow the permanent magnet to be prepositioned in the recess.

The additional presence of the one or more deformations and/or of the deformable tab allows the permanent magnet to be mechanically locked in position in the recess along the minor axis of the recess, so that it is no longer able to move. It is then locked in place in the recess. This minimizes the risk of magnetic losses at the interface between a permanent magnet and its recess, especially at the faces of the recess and the large sides of the permanent magnet.

Another subject of the present disclosure, independently of or in combination with the foregoing, is a rotor for a rotary electric machine, including a rotor body including stacked sheets, the rotor body including at least one permanent magnet that has, in cross section, especially perpendicular to an axis of rotation of the rotor, at least one large side and at least one small side, and at least one recess accommodating the permanent magnet, the recess being delimited by:

at least one face including at least one deformable tongue extending into the recess, the deformable tongue including a free end that is configured to press against the small side of the permanent magnet; and at least one face facing the large side of the permanent magnet including at least one deformation that is convex toward the interior of the recess, and preferably at least two deformations that are convex toward the interior of the recess, allowing the permanent magnet to be held against the opposite face of the recess.

The cross section of a permanent magnet is perpendicular to an axis of rotation of the rotor.

The deformable tongue may be angled. It may include a bendable portion that is configured to press against the small side of the permanent magnet.

The deformable tongue may be configured to deform out of the plane of the sheet and to include a free end that is configured to press against the small side of the permanent magnet.

The presence of the deformable tongue and the one or more deformations allow the permanent magnet to be mechanically locked in position in the recess along the major and minor axes of the recess, respectively, so that it is no longer able to move. It is then locked in place in the recess. This minimizes the risk of magnetic losses at the interface between a permanent magnet and its recess, especially at the faces of the recess and the large sides of the permanent magnet.

The face of the recess including the deformable tongue and that including the one or more deformations may be one and the same face. Alternatively, the face of the recess including the deformable tongue is different from that including the one or more deformations. For example, the face of the recess including the deformable tongue may be located facing the small side of the permanent magnet or be opposite that including the one or more deformations.

Machine and Rotor

Another subject of the present disclosure is a rotary electric machine, including a stator and a rotor as defined hereinbefore.

The machine may be used as a motor or as a generator. The machine may be a reluctance machine. It may be a synchronous motor or, alternatively, a synchronous generator. Alternatively still, it is an asynchronous machine.

The maximum rotational speed of the machine may be high, for example higher than 10,000 rpm, preferably higher than 12,000 rpm, for example from about 14,000 rpm to 15,000 rpm, or even 20,000 rpm, 24,000 rpm or 25,000 rpm. The maximum rotational speed of the machine may be lower than 100 000 rpm, or lower than 60,000 rpm, or even lower than 40,000 rpm, and preferably lower than 30,000 rpm.

The machine may be most particularly suitable for high-power machines.

The machine may include a single inner rotor or, alternatively, an inner rotor and an outer rotor, arranged radially on either side of the stator and rotationally coupled.

The machine may be placed in a casing on its own or be placed in a gearbox casing. In this case, it is placed in a casing that also houses a gearbox.

The machine includes a stator. The stator includes teeth which define slots between them. The stator may include electrical conductors, at least some of the electrical conductors, or even most of the electrical conductors, may be in the form of U- or I-shaped pins.

Production Methods

Another subject of the present disclosure is a method for producing a rotor for a rotary electric machine as defined hereinbefore.

The method may include the step of longitudinally inserting, along the axis of rotation of the rotor, at least one permanent magnet into the recess.

Another subject of the present disclosure, independently of or in combination with the foregoing, is a method for producing a rotor for a rotary electric machine, wherein a rotor body including stacked sheets is provided, the rotor body including at least one recess that is configured to accommodate at least one permanent magnet that has, in cross section, especially perpendicular to an axis of rotation of the rotor, at least one large side and at least one small side, the recess being delimited by at least one face facing the large side of the permanent magnet, at least one sheet including at least one deformable tongue connecting to said face of the recess and extending into the recess, the deformable tongue being angled and including a bendable portion that is configured to press against the small side of the permanent magnet, the method including the step of longitudinally inserting, along the axis of rotation of the rotor, at least one permanent magnet into the recess.

The cross section of a permanent magnet is perpendicular to an axis of rotation of the rotor.

The deformable tongue can include a bendable portion that is configured to be bent out of the plane of the sheet so as to press against the small side of the permanent magnet.

In the case where the rotor body includes several stacks of sheets stacked one on top of the other, the method may first include the step of longitudinally inserting at least one permanent magnet into the recess of each stack of sheets, then the step of stacking the stacks of sheets one on top of the other, with the permanent magnets in the recesses.

The insertion of the permanent magnet into the recess may cause the deformation, especially the plastic deformation, of the deformable tongue by bending so as to allow the bendable portion to press against the small side of the permanent magnet.

The deformable tongue may deform out of the plane of the sheet.

The permanent magnet may have in cross section a first small side and a second small side, opposite the first side. The bendable portion may be configured to press against the first small side of the permanent magnet. At least one sheet may include at least one stop facing the second small side of the permanent magnet.

The deformable tongue may exert, after deformation, a pushing force on the permanent magnet so as to hold it in the recess, especially against the stop.

The deformable tongue may thus allow the permanent magnet to be held in the recess, especially against the stop, during the insertion thereof into the recess.

The methods may further include the step of producing at least one deformation that is convex toward the interior of the recess, and preferably at least two deformations that are convex toward the interior of the recess, on at least one face of the recess facing a large side of the permanent magnet.

The one or more deformations may be produced after the insertion of the permanent magnet into the recess. This facilitates the production of the deformations because the permanent magnet is then already held in the recess by the deformable tongue. The one or more deformations may, for example, be produced at a workstation other than that at which the permanent magnet is inserted into the recess without risk of losing the permanent magnet since the latter is held in the recess by the deformable tongue.

The one or more deformations may allow the permanent magnet to be held against the opposite face of the recess.

The presence of the deformable tongue and the one or more deformations allow the permanent magnet to be mechanically locked in position in the recess along the major and minor axes of the recess, respectively, so that it is no longer able to move. Thus, once the one or more deformations have been produced, the permanent magnet is locked in place in the recess.

The one or more deformations may be produced on the face of the recess to which the deformable tongue is connected, or alternatively on the opposite face.

DETAILED DESCRIPTION

Figure 1:
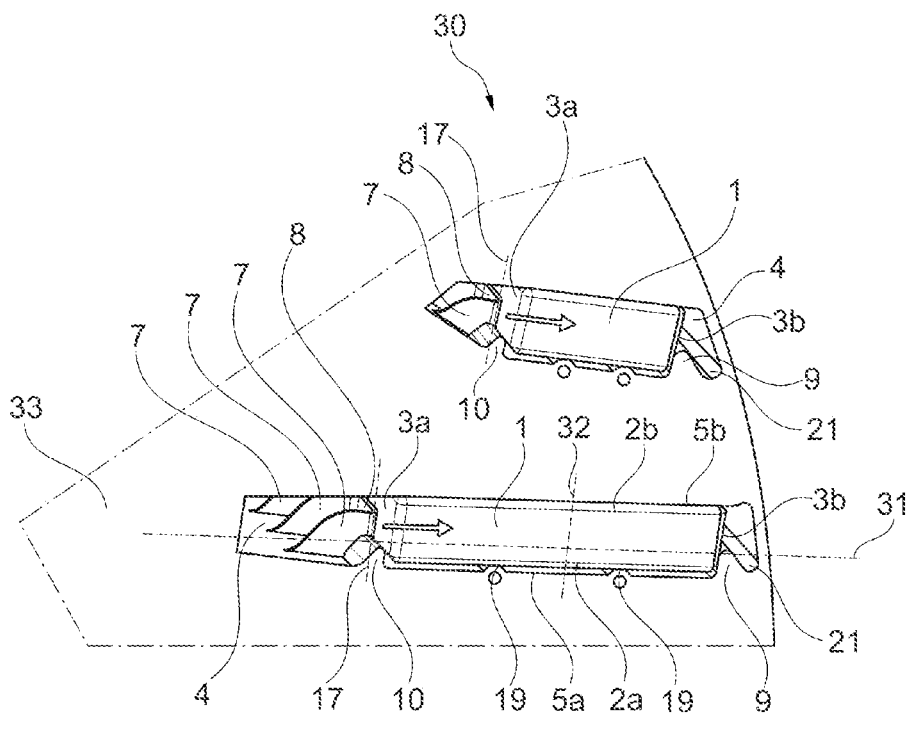
FIG. 1 is a schematic and partial perspective view of one example of a rotor for a rotary electric machine.

FIG. 1 shows one example of a rotor 30 for a rotary electric machine according to the present disclosure, including a rotor body 33 in which recesses 4 are formed. Permanent magnets 1 are inserted into each of the recesses 4.

Figure 2:
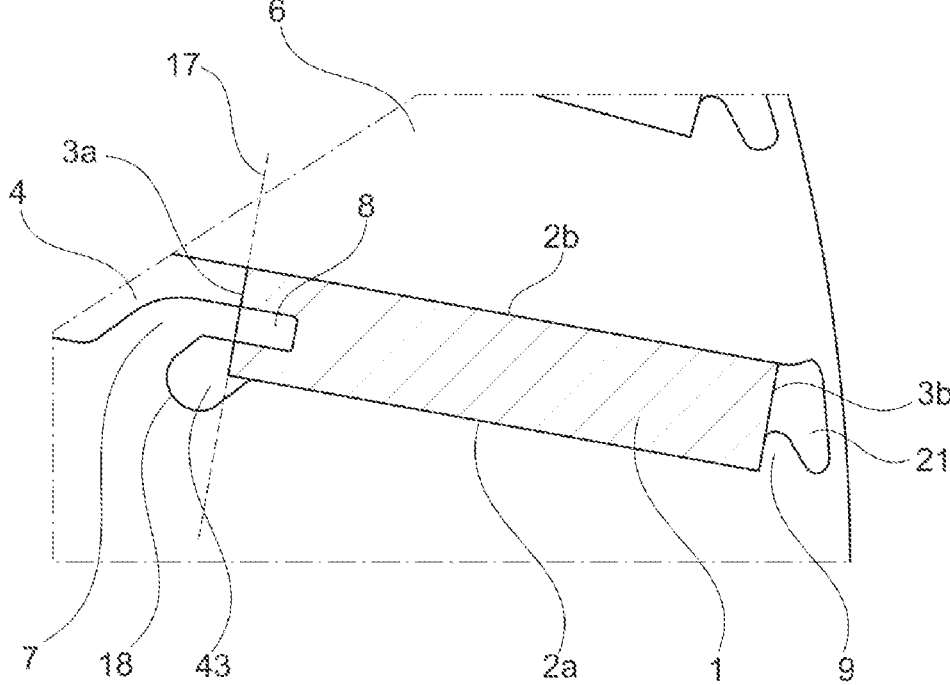
FIG. 2 is a schematic and partial view, from the front, of one example of a sheet that may be used to form an alternative embodiment of a rotor.
Figures 5, 6:
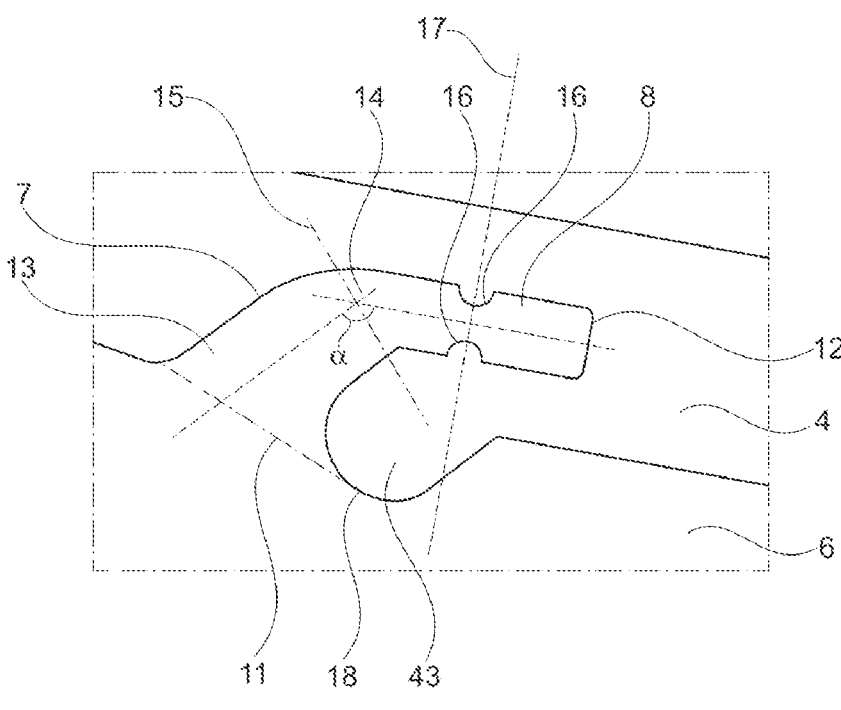
FIG. 5 is a view similar to FIG. 4 of an alternative embodiment without the permanent magnet.
FIG. 6 is a view similar to FIG. 2 of an alternative embodiment.

In this example, the magnets 1 are generally rectangular in cross section as illustrated in the embodiments of FIGS. 2 and 6. Each magnet 1 has, in cross section, both a first large side 2*a* and a second large side 2*b*, opposite the first, and a first small side 3*a* and a second small side 3*b*, opposite the first. Each recess 4 is delimited by two faces 5*a*, 5*b* that face the first large side 2*a* and the second large side 2*b* of the magnet 1, respectively.

The recesses 4 include deformable tongues 7 that are each connected to the face 5*a* of the corresponding recess 4, which face is located facing the first large side 2*a* of the corresponding magnet 1.

In one alternative not illustrated, the deformable tongues 7 are each connected to the face 5*b* of the corresponding recess 4, which face is located facing the second large side 2*b* of the corresponding magnet 1.

The deformable tongues 7 each extend into the corresponding recess 4. One and the same recess 4 may include multiple deformable tongues 7 distributed along the rotor body 33, as illustrated in FIG. 1.

Each deformable tongue 7 includes a bendable portion 8 which is bent so as to press against the first small side 3*a* of the corresponding magnet 1.

The bendable portion 8 of the deformable tongue 7 is bent out of the plane of the sheets, along a bending axis 17 of the deformable tongue 7 extending in a plane parallel to the plane of the sheet.

Each recess 4 includes a stop 9 that faces the second small side 3*b* of the corresponding magnet 1, the stop 9 connecting to the face 5*a* of the corresponding recess 4. Each stop 9 extends into a lateral portion 21 of the corresponding recess 4, facing the second small side 3*b* of the corresponding magnet 1. This lateral portion 21 allows a magnetic void to be provided, which helps to promote the flow of the magnetic flux through the rotor 30 in an optimized manner.

The stop 9 may be formed in a sheet and be integral with the rest of the sheet. One and the same sheet may include the deformable tongue 7 and the stop 9, as illustrated in FIGS. 1, 2, 3 and 6.

When its bendable portion 8 is bent so as to press against the first small side 3*a* of the corresponding magnet 1, each deformable tongue 7 exerts a pushing force on the corresponding magnet 1 in the direction of the arrows shown in FIG. 1, so as to hold it in its recess 4 against the corresponding stop 9. Thus, the presence of the deformable tongue 7 allows the magnet 1 to be mechanically locked in position in its recess 4 along the major axis 31 of the recess 4.

In the example of FIG. 1, each recess 4 includes a wedge 10 that faces the first small side 3*a* of the corresponding magnet 1, the wedge 10 connecting to the face 5*a* of the corresponding recess 4. Each wedge 10 is placed between the deformable tongue 7 and the magnet 1.

Alternatively, the recesses 4 may be without wedges 10.

In the example of FIG. 1, each recess 4 includes two deformations 19 that are convex toward the interior of the recess on the face 5*a* of the recess 4, so as to hold the magnet 1 against the opposite face 5*b* of the recess 4. These deformations 19 may be produced by punching the rotor body 33, for example using a punch whose shape is generally spherical, cylindrical with or without a radius, or pointed. A cylindrical punch with a radius has rounded edges between the bases and the lateral face of the cylinder while a cylindrical punch without a radius has sharp edges, that is edges with sharp angles. Alternatively or additionally, the deformations 19 may be present on the face 5*b* of the recess 4 so as to hold the magnet 1 against the opposite face 5*a* of the recess 4.

As an alternative, each recess 4 includes, on its face 5*a*, a deformable tab 20 that extends into the recess 4, as illustrated in FIG. 6. Each deformable tab 20 may include a free end that presses against the first large side 2*a* of the magnet 1 so as to hold it against the opposite face 5*b* of the recess 4. Each deformable tab 20 is deformed out of the plane of the sheets when the magnet 1 is in place in the recess 4. Alternatively or additionally, each recess 4 may include, on its face 5*b*, the deformable tab 20 which extends into the recess 4 and which includes a free end that presses against the second large side 2*b* of the magnet 1 so as to hold it against the opposite face 5*a* of the recess 4.

The presence of the one or more deformations 19 and/or of the deformable tab 20 allows the magnet 1 to be mechanically locked in position in its recess 4 along the minor axis 32 of the recess 4. Thus, the magnet 1 is locked in place in the recess 4 because its movement is blocked, on the one hand, by the one or more deformable tongues along the large axis 31 and, on the other hand, by the one or more deformations 19 and/or the deformable tab 20 along the small axis 32.

FIG. 2 shows one example of a sheet 6 that may be used to form the rotor according to the present disclosure. The magnet 1, seen in cross section, is inserted into the recess 4.

The bendable portion 8 of the deformable tongue 7 which is bent so as to press against the first small side 3*a* of the magnet 1 is represented in FIG. 2 by the portion 8 of the deformable tongue 7 which extends beyond the first small side 3a of the magnet 1.

The deformable tongue 7 is formed in the sheet 6. As shown in FIG. 2, the deformable tongue 7 is integral with the rest of the sheet 6.

As illustrated in FIGS. 2 to 6, the recess 4 includes a cutout 18 made in the face 5a of the recess 4 to which the deformable tongue 7 is connected.

Figure 4:
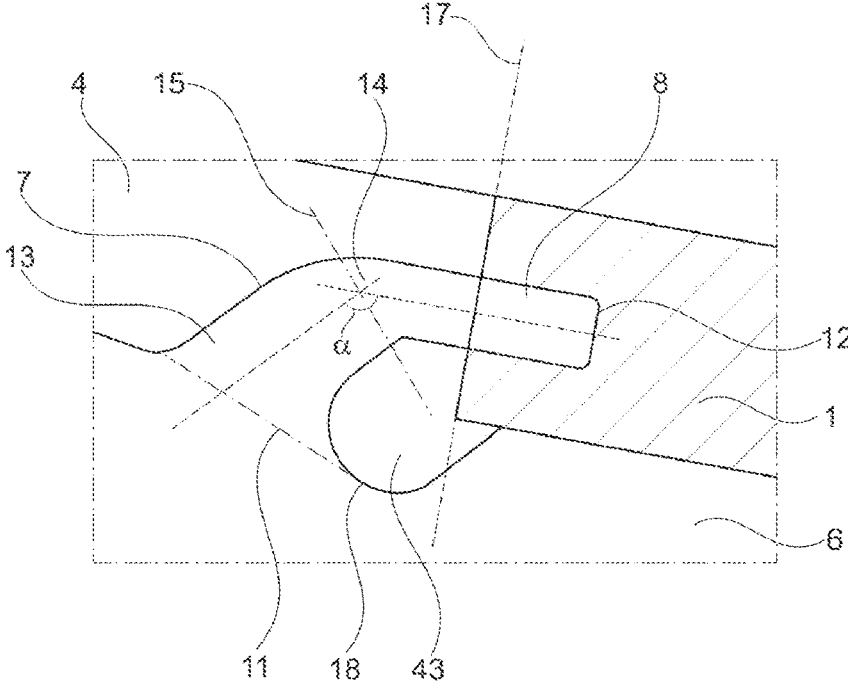
FIG. 4 shows a design detail of the sheet of FIG. 2.

As shown in FIGS. 2, 4 and 6, the cutout 18 is made in the face 5a of the recess 4, between the deformable tongue 7 and the magnet 1. Part of the magnet 1 extends into the space 43 formed in the recess 4 by the cutout 18. The magnet 1 thus at least partially covers the cutout 18.

Figure 3:
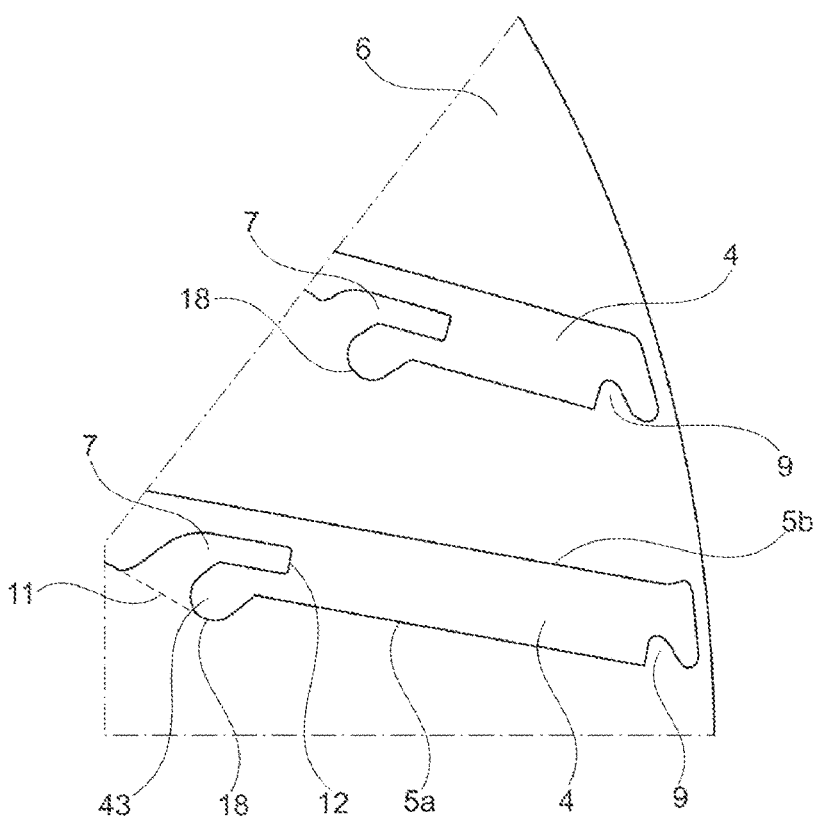
FIG. 3 is a view similar to FIG. 2 but without the permanent magnet.

As shown in FIG. 3, the deformable tongue 7 extends between a connecting end 11 that allows the deformable tongue 7 to be connected to the face 5a of the recess 4 and a free end 12. The width of the deformable tongue 7 decreases from its connecting end 11 to its free end 12. For example, the deformable tongue 7 has a width of 2.5 mm at its connecting end 11 and a width of 1.5 mm at its free end 12.

As shown in FIG. 4, the deformable tongue 7 is angled along its axis of elongation. It includes an angled portion 15 that connects two rectilinear portions of the deformable tongue 7 to one another, namely a first rectilinear portion 13 and a second rectilinear portion 14.

The first rectilinear portion 13 extends between the connecting end 11 and the angled portion 15 of the deformable tongue 7. In this example, the first rectilinear portion 13 has a length of 1.35 mm.

The second rectilinear portion 14 extends between the angled portion 15 and the bending axis 17 of the deformable tongue 7. In this example, the second rectilinear portion 14 has a length of 2.1 mm.

The bendable portion 8 extends between the bending axis 17 and the free end 12 of the deformable tongue 7. In this example, the bendable portion 8 has a length of 2.5 mm.

In the example of FIG. 4, the angle α between the first 13 and second 14 rectilinear portions is about 135°.

As shown in FIG. 5, the deformable tongue 7 may have a narrowing 16 in its width at its bending axis 17. This narrowing 16 may make it possible to facilitate the deformation of the deformable tongue 7 through the bending of its bendable portion 8.

Alternatively, the deformable tongue 7 does not exhibit any narrowing 16 in its width at its bending axis 17.

Figure 7:
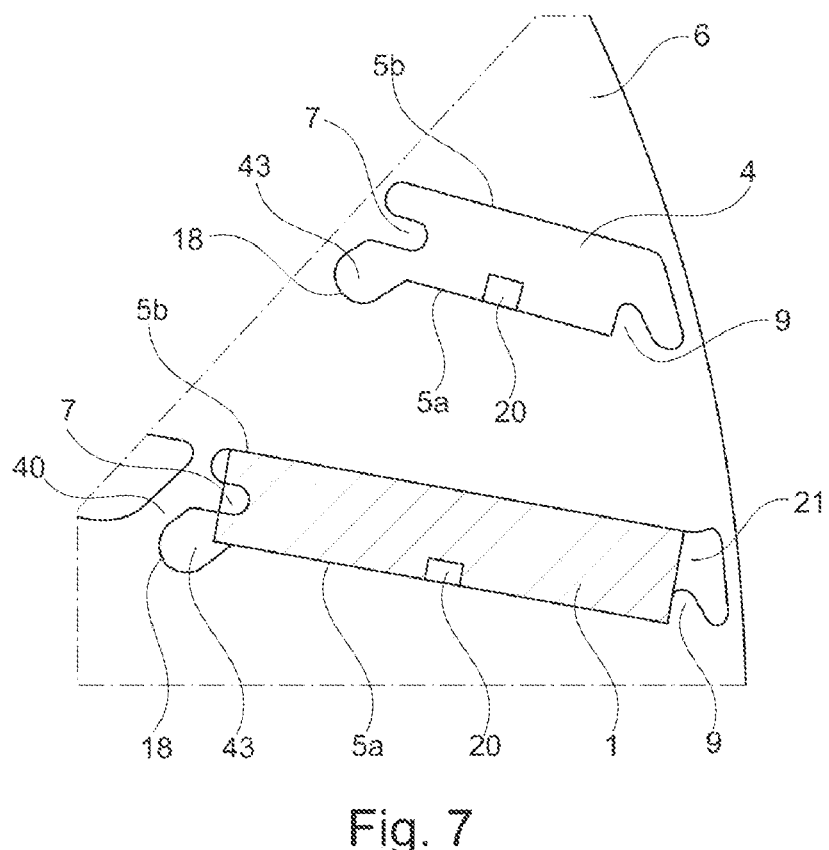
FIG. 7 is a view similar to FIG. 6 of an alternative embodiment.

As shown in FIG. 7, the deformable tongue 7 may, in addition to connecting to the face 5a of the corresponding recess 4, which face is located facing the first large side 2a of the corresponding magnet 1, also connect to the face 5b of the recess 4, which face is located facing the second large side 2b of the corresponding magnet 1. There is then a bridge 40 connecting faces 5a and 5b of the recess 4. When the permanent magnet 1 is longitudinally inserted into the recess 4, the bridge 40 may deform in addition to the deformable tongue 7. For example, it may undergo a twisting deformation.

Of course, the present disclosure is not limited to the exemplary embodiments that have just been described.

The rotor body 33 may have other arrangements of the recesses for accommodating the magnets, within the rotor body.

The recesses 4 and the magnets 1 may take other geometric shapes.

The recesses may each extend along a longitudinal axis that may be rectilinear or curved.

The invention claimed is:

1. A rotor for a rotary electric machine, including:
at least one permanent magnet that has, in cross section, perpendicular to an axis of rotation of the rotor, at least one large side and at least one small side,
a rotor body including sheets stacked on one another, the rotor body including at least one recess accommodating the permanent magnet, the recess being delimited by at least one face facing the large side of the permanent magnet,
at least one sheet including at least one deformable tongue connecting to said face of the recess and extending into the recess, the deformable tongue being angled and including a bendable portion that is configured to be bent out of the plane of the sheet so as to press against the small side of the permanent magnet, and wherein, the bendable portion of said deformable tongue is configured to press substantially against the middle of the small side of the permanent magnet.

2. The rotor according to claim 1, the permanent magnet having, in cross section, a first small side and a second small side, opposite the first small side, the bendable portion being configured to press against the first small side of the permanent magnet, at least one sheet including at least one stop facing the second small side of the permanent magnet.

3. The rotor according to claim 1, the permanent magnet having, in cross section, a first small side and a second small side, opposite the first small side, the bendable portion being configured to press against the first small side of the permanent magnet, at least one sheet including at least one wedge facing the first small side of the permanent magnet.

4. The rotor according to claim 1, the deformable tongue extending between a connecting end for connecting to the face of the recess and a free end, the width of the deformable tongue being able especially to decrease from its connecting end to its free end.

5. The rotor according to claim 1, the deformable tongue including an axis of elongation including two rectilinear portions, namely a first rectilinear portion at the connecting end of the deformable tongue, and a second rectilinear portion at the bendable portion of the deformable tongue.

6. The rotor according to claim 1, the deformable tongue exhibiting a narrowing in its width.

7. The rotor according to claim 1, the deformable tongue including a bending axis that extends in a plane parallel to the plane of the sheet.

8. The rotor according to claim 1, the recess including a cutout made in the face of the recess to which the deformable tongue is connected.

9. The rotor according to claim 1, including at least two deformable tongues distributed along the rotor body for one and the same recess.

10. The rotor according to claim 1, the recess being delimited by at least one face facing a large side of the permanent magnet, said face including at least one deformation that is convex toward the interior of the recess.

11. The rotor according to claim 1, the recess being delimited by at least one face facing a large side of the permanent magnet, said face including at least one deformable tab that extends into the recess, the deformable tab including a free end that is configured to press against the large side of the permanent magnet and to hold the permanent magnet against the opposite face of the recess.

12. A rotary electric machine, including a stator and a rotor according to claim 1.

13. The rotor according to claim 1, wherein the bendable portion of said deformable tongue is configured to press substantially against the middle of the small side of the permanent magnet.

14. A rotor for a rotary electric machine, including a rotor body including sheets stacked on one another, the rotor body including at least one permanent magnet that has, in cross section, perpendicular to an axis of rotation of the rotor, at least one large side and at least one small side, and at least one recess accommodating the permanent magnet, the recess being delimited by:

at least one face including at least one deformable tongue extending into the recess, the deformable tongue being configured to deform out of the plane of the sheet and including a free end that is configured to press against the small side of the permanent magnet, the deformable tongue including a bendable portion, the bendable portion of said deformable tongue is configured to press substantially against the middle of the small side of the permanent magnet; and at least one face facing the large side of the permanent magnet including at least one deformation that is convex toward the interior of the recess, allowing the permanent magnet to be held against an opposite face of the recess.

15. A method for producing a rotor for a rotary electric machine, wherein a rotor body including sheets stacked on one another is provided, the rotor body including at least one recess that is configured to accommodate at least one permanent magnet that has, in cross section, perpendicular to an axis of rotation of the rotor, at least one large side and at least one small side, the recess being delimited by at least one face facing the large side of the permanent magnet, at least one sheet including at least one deformable tongue connecting to said face of the recess and extending into the recess, the deformable tongue being angled and including a bendable portion that is configured to be bent out of the plane of the sheet so as to press against the small side of the permanent magnet, the bendable portion of said deformable tongue is configured to press substantially against the middle of the small side of the permanent magnet, the method including the step of longitudinally inserting, along the axis of rotation of the rotor, at least one permanent magnet into the recess.

16. The method according to claim 15, the insertion of the permanent magnet into the recess causing the deformation of the deformable tongue by bending so as to allow the bendable portion to press against the small side of the permanent magnet.

* * * * *